(12) United States Patent
Tan

(10) Patent No.: US 8,397,923 B2
(45) Date of Patent: Mar. 19, 2013

(54) TILTING TRAY BAG DISPENSER RACK

(76) Inventor: Daniel Brian Tan, Harahan, LA (US)

( * ) Notice: Subject to any disclaimer, the term of this patent is extended or adjusted under 35 U.S.C. 154(b) by 245 days.

(21) Appl. No.: 12/940,678

(22) Filed: Nov. 5, 2010

(65) Prior Publication Data

US 2012/0111811 A1   May 10, 2012

(51) Int. Cl.
*A47F 13/085* (2006.01)
*A47F 5/0084* (2006.01)
*A47B 2031/003* (2006.01)

(52) U.S. Cl. .............. 211/85.15; 211/12; 211/126.15; 211/85.29

(58) Field of Classification Search .............. 211/85.15, 211/12, 181.1, 126.1, 126.15, 85.29, 116, 211/133.5, 133.6; 312/248, 327, 328; 108/26; 248/284.1, 291.1, 292.11, 292.13
See application file for complete search history.

(56) References Cited

U.S. PATENT DOCUMENTS

| | | | |
|---|---|---|---|
| 2,203,008 A * | 6/1940 | Bauman | 312/309 |
| 2,245,518 A | 6/1941 | Allen | |
| 2,630,359 A * | 3/1953 | Schade | 108/136 |
| 3,331,645 A * | 7/1967 | Vercellotti | 312/248 |
| 3,586,317 A | 6/1971 | Smitzer | |
| 3,684,158 A | 8/1972 | Harris | |
| 3,777,439 A | 12/1973 | Fried | |
| 3,846,005 A * | 11/1974 | Harper et al. | 312/248 |
| 3,857,623 A * | 12/1974 | Schneller | 312/266 |
| 3,896,966 A | 7/1975 | Canno | |
| 4,150,861 A * | 4/1979 | Dufrancatel | 312/266 |
| 4,269,407 A | 5/1981 | Tsuda et al. | |
| 4,285,557 A * | 8/1981 | Paladino et al. | 312/246 |
| 4,691,888 A * | 9/1987 | Cotterill | 248/284.1 |
| 4,785,971 A | 11/1988 | Konarik | |
| 5,183,158 A | 2/1993 | Boyd et al. | |
| 5,308,158 A * | 5/1994 | Vogelgesang et al. | 312/319.3 |
| 5,407,261 A * | 4/1995 | Mercer | 312/248 |
| 5,584,402 A | 12/1996 | Johnson | |
| 5,725,293 A * | 3/1998 | Wilkening et al. | 312/248 |
| 5,752,696 A | 5/1998 | Nakatani et al. | |
| 5,941,392 A | 8/1999 | Huang et al. | |
| 6,098,806 A | 8/2000 | Mills | |
| 6,119,879 A * | 9/2000 | Acchione | 211/99 |
| 6,318,567 B1 * | 11/2001 | Braley | 211/70.7 |
| 6,322,067 B1 | 11/2001 | Fujii et al. | |
| 7,175,025 B2 | 2/2007 | Chum | |
| 7,316,326 B2 * | 1/2008 | Kim et al. | 211/90.03 |
| 7,591,396 B2 | 9/2009 | Tramontina et al. | |
| 2010/0164169 A1 | 7/2010 | Wakakusa | |

* cited by examiner

*Primary Examiner* — Jennifer E. Novosad

(74) *Attorney, Agent, or Firm* — David A. Belasco; Belasco Jacobs & Townsley, LLP

(57) ABSTRACT

A tilting tray bag dispenser rack includes a support tray that has a base, a first side wall, a second side wall, a back wall and a front wall that holds a merchandise bag pack and has an opening for extraction of bags. The tray is hingedly attached adjacent an upper edge of the back wall to an underside of a counter. First and second side support linkage has a first and second upper and lower arms The upper arms are pivotally attached to first and second side brackets attached to the underside of the counter. The lower arms are pivotally attached to the upper arms and pivotally attached to outer surfaces of the first and second side walls. A position retention device retains the tray in an upper, bag delivery position when engaged and permits the bag pack support tray to move to a lower, loading position when disengaged.

16 Claims, 13 Drawing Sheets

TILTING TRAY BAG DISPENSER RACK

FIELD OF INVENTION

This invention relates to the field of packaging dispensing systems, and more specifically to space efficient dispensing systems for merchandise bags.

BACKGROUND OF THE INVENTION

Counter space in grocery stores, supermarkets and other retail establishments is often at a premium. Most of these businesses provide disposable merchandise bags for their customers to use in transporting their purchases. When using film bags, such as those made of thermoplastics or similar materials, it is desirable that the bag dispensing systems provide bags that are self-opening. Typically, self-opening bag dispensing systems require a rack that holds a pack of merchandise bags on a central hook and a pair of horizontal arms. Such dispensing systems are usually placed on top of a check-out counter and require a square foot of counter space or more, depending upon the bag size. If self-opening bags can be conveniently dispensed without using this counter space, merchandise can be more efficiently handled at check-out counters.

U.S. Pat. No. 6,322,067, issued to Fujii et al., discloses a sheet loading apparatus for an imaging forming device. The sheet cassette shown in this patent has a pivotally mounted sheet loading plate that resembles the bag holding tray device seen in your disclosure material. The sheet loading plate has cutout portions that depend upon the size of sheets to be supplied with side guides on the sheet loading plate. A lifting mechanism with a link rod is pivoted by a driver within the apparatus and configured to lift the sheet loading plate by means of the plate when the link rod is rotated. This linkage provides for two different positions of the loading plate which may correspond to the loading and unloading positions of the tray seen in your disclosure material.

U.S. Pat. No. 5,584,402 issued to Johnson is directed to a rack for storing and dispensing a supply of bags includes a base member. The base member includes a track extending between first and second ends of the base member. The rack has first and second ends and is adapted for supporting a supply of bags. The rack includes structure for engaging the track of the base member. The rack is slidable on the base member between a bag loading position in which the rack first end is disposed adjacent to the base member second end, and a bag storing and dispensing position in which the rack first end is disposed adjacent to the base member first end.

U.S. Patent Application No. 2010/0164169 published for Wakakusa illustrates a sheet storing device includes a container including a first holding surface configured to hold a first sheet thereon, and a tray positioned at an upper side of the container. The tray includes a second holding surface configured to hold a second sheet thereon. The tray is configured to selectively move between a first position and a second position downstream from the first position in a first direction. The sheet storing device further includes a positioning unit configured to selectively position the tray in one of the first position and the second position, and a linking unit configured to link the tray to the container and to pivot about a particular pivot axis which extends in a second direction perpendicular to the first direction and parallel to the first holding surface of the container. The linking unit pivots to selectively move the tray between the first position and the second position.

U.S. Pat. No. 3,777,439, issued to Fried disclose a bag-opening dispenser and method and shows a container that is stored in a horizontal manner and wherein the front edge of the upper wall of the bag is gripped and pulled longitudinally and upwardly while the bottom edge of the bag is held by a weighted bar. Thus, the bag is held until it has been pulled open and then removed from under the bar such that the bag is ready for receiving merchandise.

U.S. Pat. No. 2,245,518, issued to Allen is directed to a paper bag holder and provides another example of a tray-like device that contains bags held in a horizontal configuration and provides for the individual removal of individual bags as they are needed.

U.S. Pat. No. 7,175,025, issued to Chum discloses a convenience package for thin film products according to aspects of the present invention places a folded stack of thin film plastic bags inside a container to protect the bags during shipping, handling and dispensing. The container surrounds the plastic bags and includes an opening through which individual bags are retrieved. The plastic bags are attached to each other in such a manner that retrieval of a first bag through the opening in the container partially retrieves a second bag and leaves part of the second bag protruding through the opening. Attachments between bags within the container ensure that each bag is opened as it is retrieved through the opening.

It is an objective of the present invention to provide a dispensing system for self-opening merchandise bags that minimizes the use of check-out counter space. It is a further objective to provide such a system that can be mounted beneath a check-out counter. It is a still further objective of the invention to provide a bag dispensing system that is easy to load and provides visual inventory of the bags remaining in the bag pack. It is yet a further objective to provide a dispenser that can handle t-shirt style bags as well as header bags. Finally, it is an objective of the present invention to provide a dispensing system that is durable, inexpensive and simple for check-out personnel to operate.

While some of the objectives of the present invention are disclosed in the prior art, none of the inventions found include all of the requirements identified.

SUMMARY OF THE INVENTION

The present invention addresses all of the deficiencies of prior art A tilting tray bag dispenser rack inventions and satisfies all of the objectives described above.

(1) A tilting tray bag dispenser rack providing the desired features may be constructed from the following components. A bag pack support tray is provided. The support tray has a base, a first side wall, a second side wall, a back wall, a front wall and is sized and shaped to hold a merchandise bag pack. The front wall has an opening that is sized and shaped to permit extraction of bags from the bag pack. The bag pack support tray is hingedly attached adjacent an upper edge of the back wall to an underside of a counter. A first side support linkage is provided. The first side linkage has a first upper arm and a first lower arm. The first upper arm is pivotally attached to a first side bracket. The first side bracket is attached to the underside of the counter. The first lower arm is pivotally attached to the first upper arm and pivotally attached to an outer surface of the first side wall.

A second side support linkage is provided. The second side linkage has a second upper arm and a second lower arm. The second upper arm is pivotally attached to a second side bracket. The second side bracket is attached to the underside of the counter. The second lower arm is pivotally attached to the second upper arm and pivotally attached to an outer surface of the second wall. At least one position retention device is provided. The position retention device has a moving portion and a stationary portion. The stationary portion is attached to one of the underside of the counter and the bag pack support tray. The moving portion is attached to the other of the underside of the counter and the bag pack support tray. The moving portion removably engages the stationary portion and retains the bag pack support tray in an upper, bag delivery position when engaged and permits the bag pack support tray to move to a lower, loading position when disengaged.

(2) In a variant of the invention, each of the first upper arm and the first lower arm have a first end, a midpoint, a second end and upper and lower edges. The first upper arm is pivotally attached adjacent the first end to the first side bracket. The first lower arm is pivotally attached adjacent the midpoint adjacent the second end of the first upper arm and pivotally attached adjacent the second end to the outer surface of the first side wall. The lower edge of the first lower arm has an outward facing ledge. The ledge is sized, shaped and located to rest upon the upper edge of the first upper arm when the bag pack support tray is in the lower, loading position, thereby limiting further movement of the tray.

Each of the second upper arm and the second lower arm have a first end, a midpoint, a second end and upper and lower edges. The second upper arm is pivotally attached adjacent the first end to the second side bracket. The second lower arm is pivotally attached adjacent the midpoint adjacent the second end of the second upper arm and pivotally attached adjacent the second end to the outer surface of the second side wall. The lower edge of the second lower arm has an outward facing ledge. he ledge is sized, shaped and located to rest upon the upper edge of the second upper arm when the bag pack support tray is in the lower, loading position, thereby limiting further movement of the tray.

(3) In another variant, each of the upper edges of the first and second upper arms has an outward facing bulge. The bulges provide a bearing surface for the outward facing ledges of the lower edges of the first and second lower arms.

(4) In still another variant, the stationary portion of the at least one position retention device further includes a spring-loaded check ball. The check ball is located to move laterally. The moving portion further includes a detent panel. The detent panel is sized, shaped and located to removably engage the spring-loaded check ball. Upward movement of the support tray will cause the at least one the detent panel to removably engage the at least one spring-loaded check ball, thereby retaining the tray in an uppermost position.

(5) In yet another variant, tension on the spring-loaded check ball is adjustable.

(6) In a further variant, one of the moving portion and the stationary portion of the at least one position retention device is attached to at least one of the first and second side brackets. The other of the moving portion and the stationary portion is attached to a corresponding outer surface of one of the first and second side walls.

(7) In still a further variant, the tilting tray bag dispenser rack further includes at least one mounting spike. The at least one mounting spike extends upwardly from the base for a first predetermined distance and is located to align with an aperture extending through the bag pack.

(8) In yet a further variant, the moving portion is magnetically attracted to the stationary portion.

(9) In another variant of the invention, the bag pack support tray is formed from materials selected from the group includes wire, injection molded material, sheet metal and wood.

(10) In still another variant, the bag pack support tray is sized and shaped to hold a plurality of merchandise bags in a stacked configuration.

(11) In yet another variant, the bag pack support tray is sized and shaped to hold a plurality of merchandise bags in a folded configuration.

(12) In a further variant, one of the moving portion and the stationary portion is a first fastening device selected from the group includes hooks, loops, bails and chains. The other of the moving portion and the stationary portion is selected from the group includes components sized shaped and located to removably engage the first fastening device.

(13) In another variant of the invention, the at least one mounting spike is removably attached to the base.

(14) In still another variant, the at least one mounting spike is movably attached to the base, thereby providing alternative locations for the mounting spike on the base.

(15) In yet another variant, at least one securing hook is provided. The at least one securing hook is attached to the base and is located to align with an aperture extending through the bag pack.

(16) In a further variant, the at least one securing hook is removably attached to the base.

(17) In a final variant, the at least one securing hook is movably attached to the base, thereby providing alternative locations for the securing hook on the base.

An appreciation of the other aims and objectives of the present invention and an understanding of it may be achieved by referring to the accompanying drawings and the detailed description of a preferred embodiment.

DESCRIPTION OF THE DRAWINGS

DETAILED DESCRIPTION OF THE PREFERRED EMBODIMENT (1) FIGS. 1-12 illustrate a tilting tray bag dispenser rack 10 providing the desired features that may be constructed from the following components. As illustrated in FIGS. 1-3, a bag pack support tray 14 is provided. The support tray 14 has a base 18, a first side wall 22, a second side wall 26, a back wall 30, a front wall 34 and is sized and shaped to hold a merchandise bag pack 38. The front wall 34 has an opening 42 that is sized and shaped to permit extraction of bags 46 from the bag pack 38. The bag pack support tray 14 is hingedly attached adjacent an upper edge 50 of the back wall 30 to an underside 54 of a counter 58. A first side support linkage 62 is provided. The first side linkage 62 has a first upper arm 66 and a first lower arm 70. The first upper arm 66 is pivotally attached to a first side bracket 74. The first side bracket 74 is attached to the underside 54 of the counter 58. The first lower arm 70 is pivotally attached to the first upper arm 66 and pivotally attached to an outer surface 78 of the first side wall 22.

Figure 1:
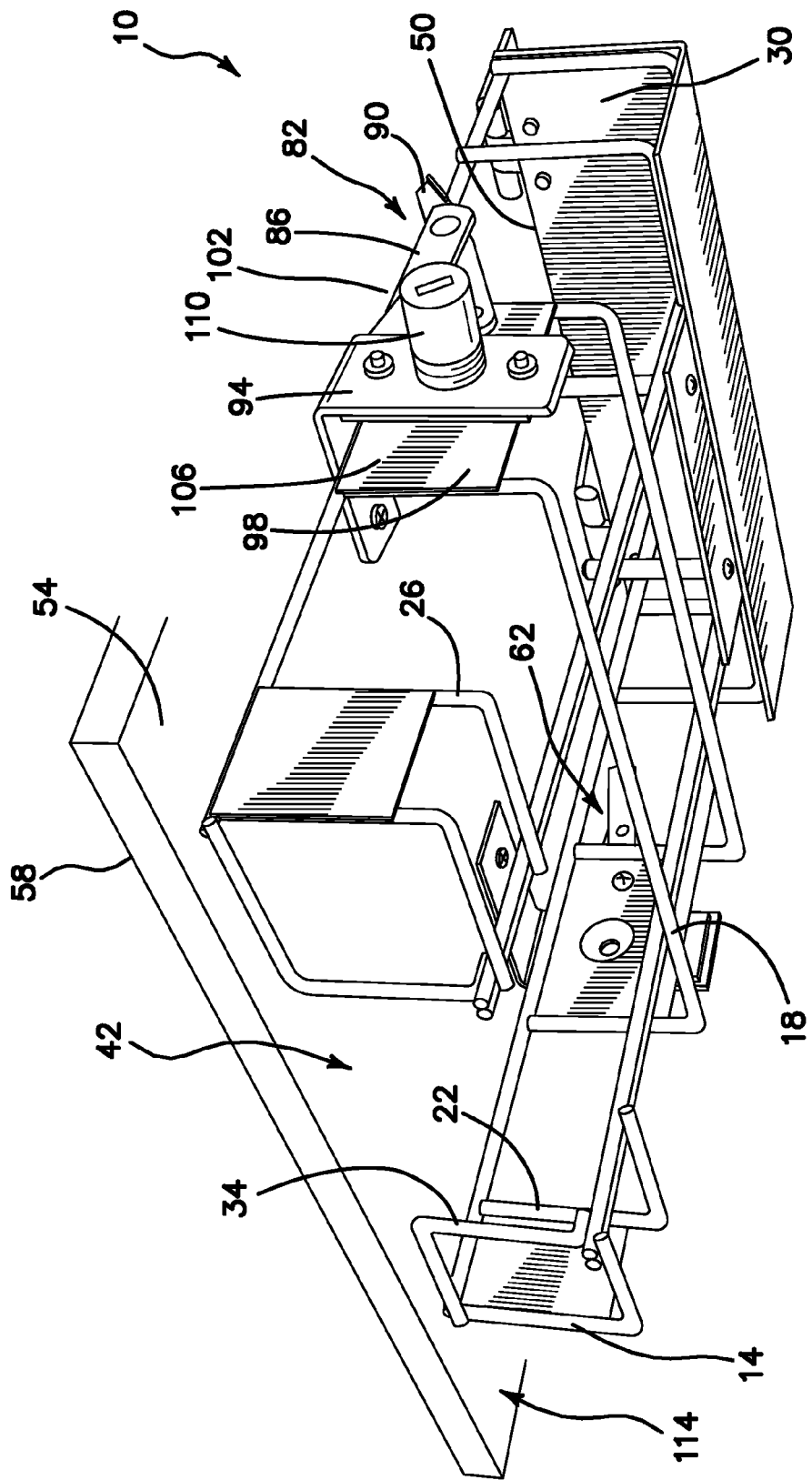
FIG. 1 is a right side perspective view of the preferred embodiment of the invention in the upper, bag dispensing position.

A second side support linkage 82 is provided. The second side linkage 82 has a second upper arm 86 and a second lower arm 90. The second upper arm 86 is pivotally attached to a second side bracket 94. The second side bracket 94 is attached to the underside 54 of the counter 58. The second lower arm 90 is pivotally attached to the second upper arm 86 and pivotally attached to an outer surface 98 of the second side wall 26. At least one position retention device 102 is provided. The position retention device 102 has a moving portion 106 and a stationary portion 110. The stationary portion 110 is attached to one of the underside 54 of the counter 58 and the bag pack support tray 14. The moving portion 106 is attached to the other of the underside 54 of the counter 58 and the bag pack support tray 14. The moving portion 106 removably engages the stationary portion 110 and retains the bag pack support tray 14 in an upper, bag delivery position 114 when engaged and permits the bag pack support tray 14 to move to a lower, loading position 118 when disengaged.

Figure 3:
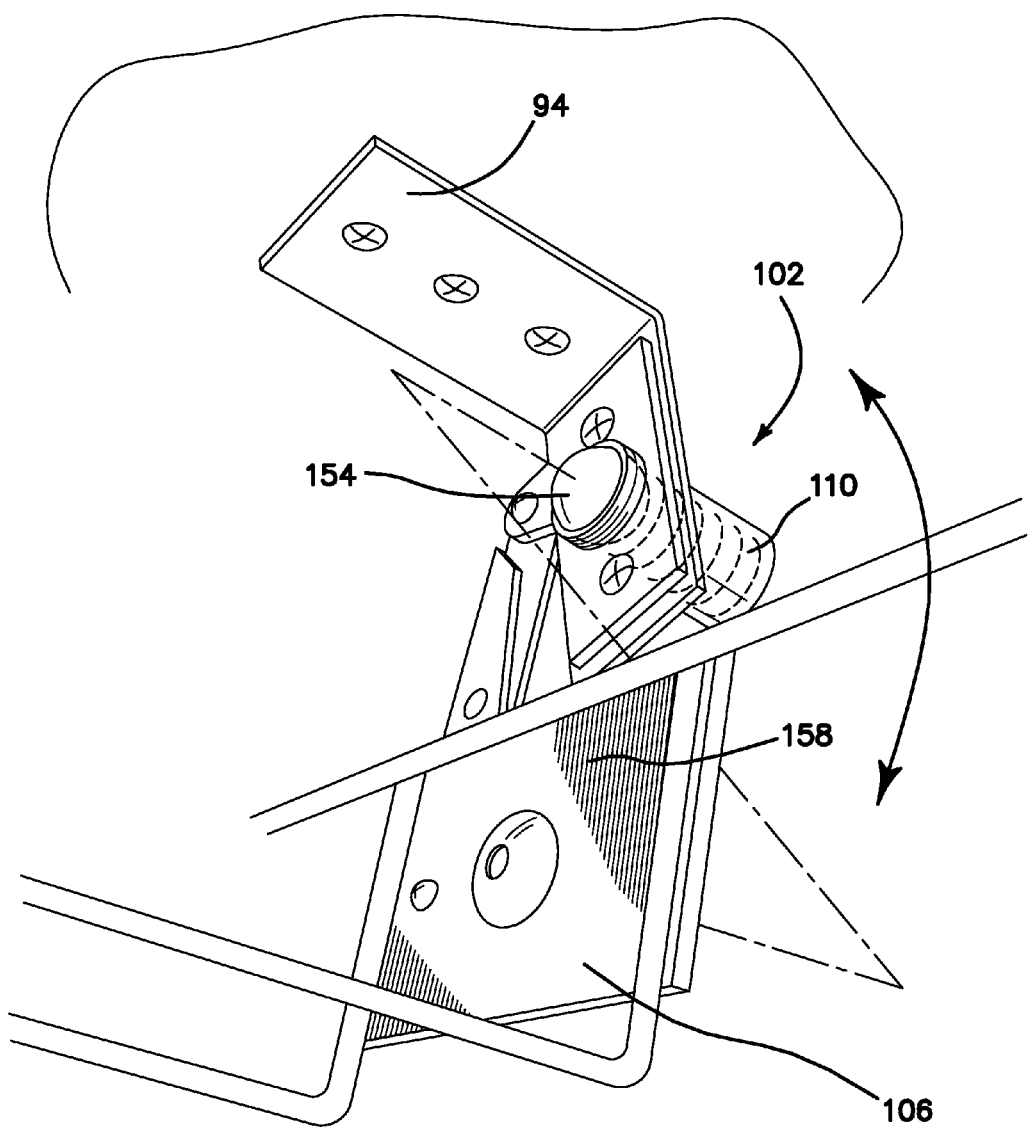
FIG. 3 is a is a perspective view of the at least one position retention device of the FIG. 1 embodiment in the lower, bag loading position.
Figure 3A:
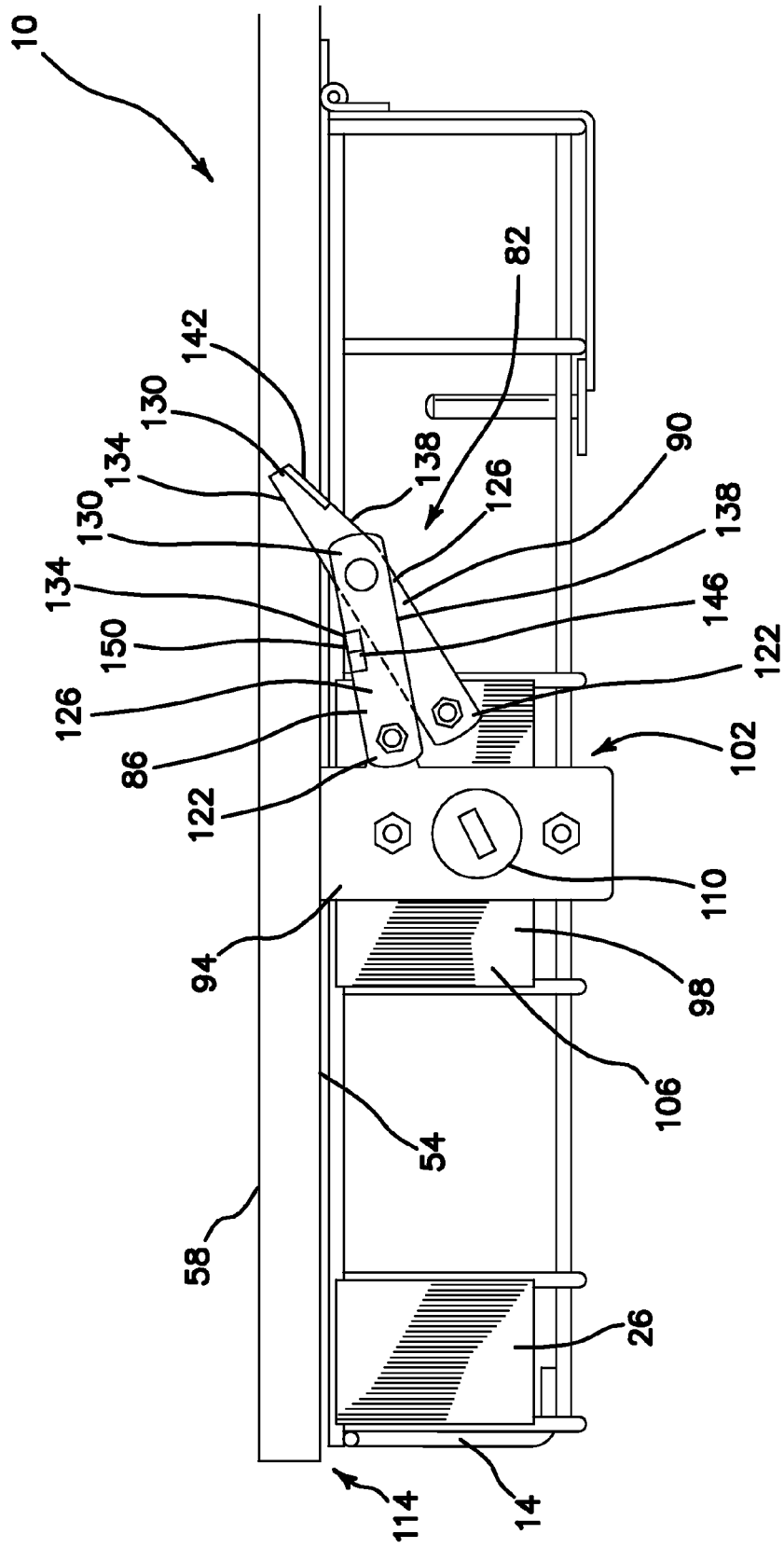
FIG. 3A is a right side elevational view of the FIG. 1 embodiment illustrating the second side linkage with the tray in the upper, bag dispensing position.
Figure 3B:
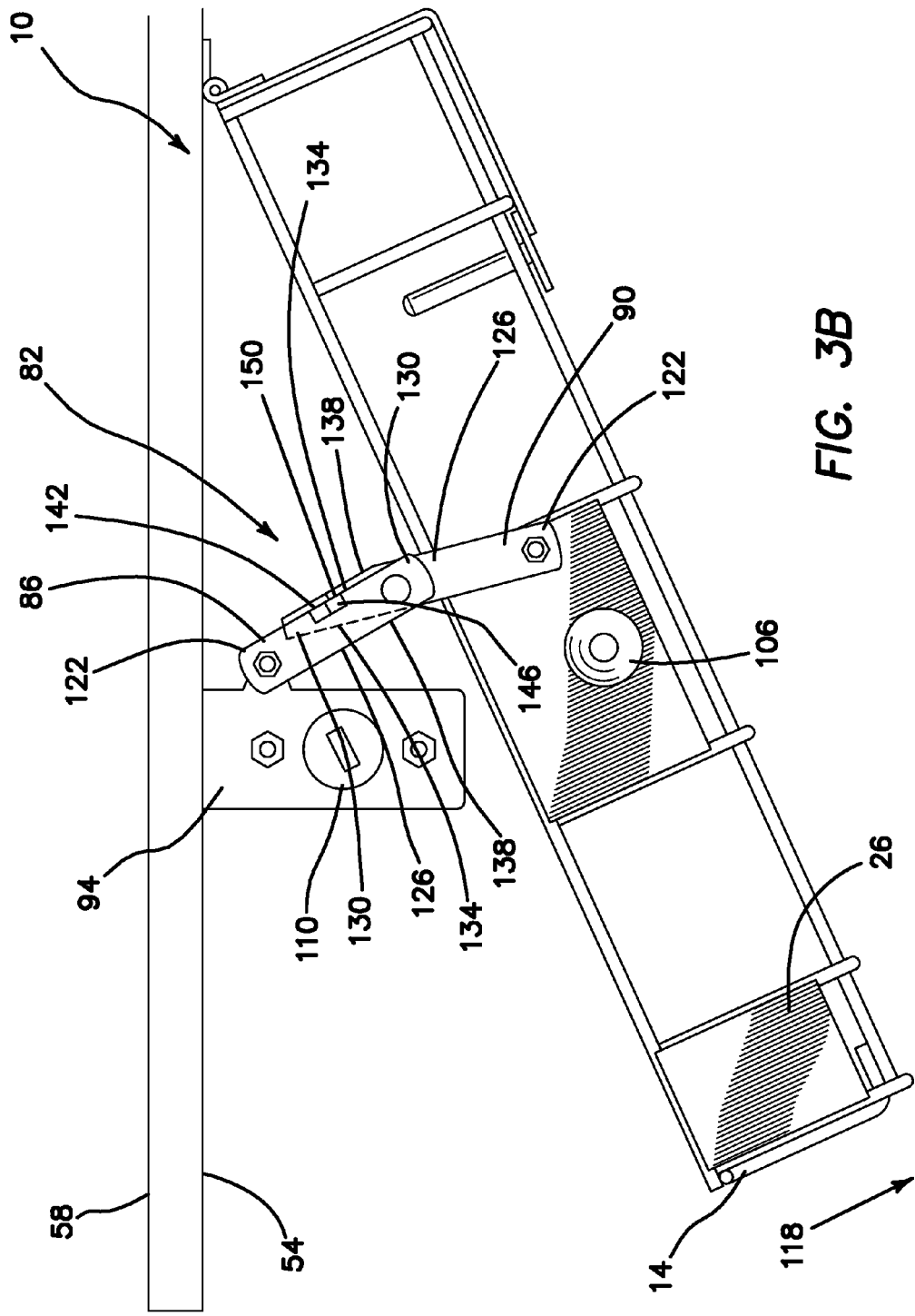
FIG. 3B is a right side elevational view of the FIG. 1 embodiment illustrating the second side linkage with the tray in the lower, bag loading position.

(2) In a variant of the invention, As illustrated in FIGS. 3A and 3B, each of the first upper arm 66 and the first lower arm 70 have a first end (not shown), a midpoint (not shown), a second end (not shown) and upper (not shown) and lower edges (not shown). The first upper arm 66 is pivotally attached adjacent the first end to the first side bracket 74. The first lower arm 70 is pivotally attached adjacent the midpoint adjacent the second end of the first upper arm 66 and pivotally attached adjacent the second end to the outer surface 78 of the first side wall 22. The lower edge of the first lower arm 70 has an outward facing ledge (not shown). The ledge is sized, shaped and located to rest upon the upper edge of the first upper arm 66 when the bag pack support tray 14 is in the lower, loading position 118, thereby limiting further movement of the tray 14.

Each of the second upper arm 86 and the second lower arm 90 have a first end 122, a midpoint 126, a second end 130 and upper 134 and lower 138 edges. The second upper arm 86 is pivotally attached adjacent the first end 122 to the second side bracket 94. The second lower arm 90 is pivotally attached adjacent the midpoint 126 adjacent the second end 130 of the second upper arm 86 and pivotally attached adjacent the second end 130 to the outer surface 98 of the second side wall 26. The lower edge 138 of the second lower arm 90 has an outward facing ledge 142. The ledge 142 is sized, shaped and located to rest upon the upper edge 134 of the second upper arm 86 when the bag pack support tray 14 is in the lower, loading position 118, thereby limiting further movement of the tray 14.

(3) In another variant, each of the upper edges 134 of the first 66 and second 86 upper arms has an outward facing bulge 146. The bulges 146 provide a bearing surface 150 for the outward facing ledges 142 of the lower edges 138 of the first 70 and second 90 lower arms.

(4) In still another variant, as illustrated in FIG. 3, the stationary portion 110 of the at least one position retention device 102 further includes a spring-loaded check ball 154. The check ball 154 is located to move laterally. The moving portion 106 further includes a detent panel 158. The detent panel 158 is sized, shaped and located to removably engage the spring-loaded check ball 154. Upward movement of the support tray 14 will cause the at least one the detent panel 158 to removably engage the at least one spring-loaded check ball 154, thereby retaining the tray 14 in an uppermost position 114.

(5) In yet another variant, tension on the spring-loaded check ball 154 is adjustable.

Figure 2:
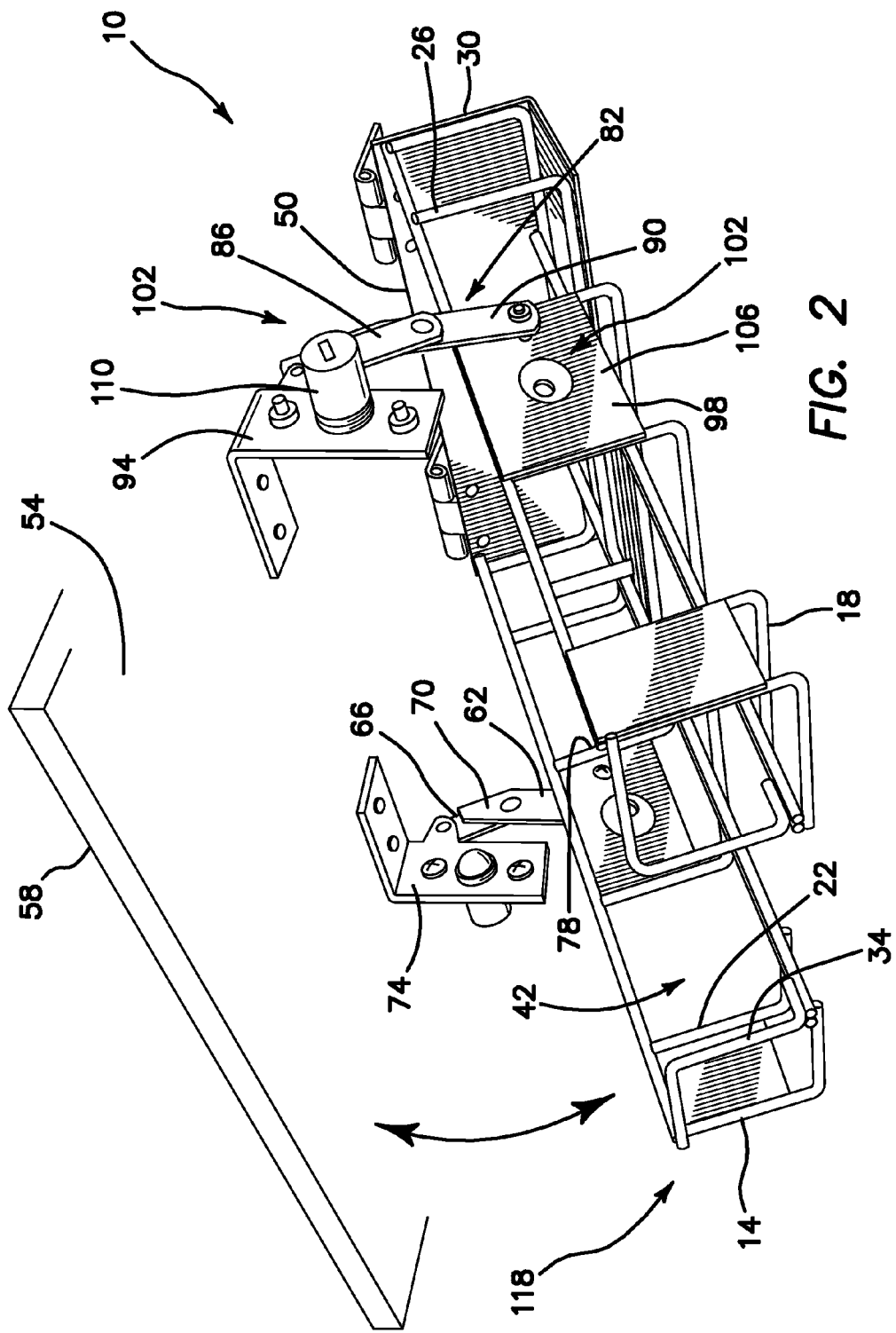
FIG. 2 is a right side perspective view of the FIG. 1 embodiment in the lower, bag loading position.

(6) In a further variant, as illustrated in FIGS. 1 and 2, one of the moving portion 106 and the stationary portion 110 of the at least one position retention device 102 is attached to at least one of the first 74 and second 94 side brackets. The other of the moving portion 106 and the stationary portion 110 is attached to a corresponding outer surface 78, 98 of one of the first 22 and second 26 side walls.

Figure 4:
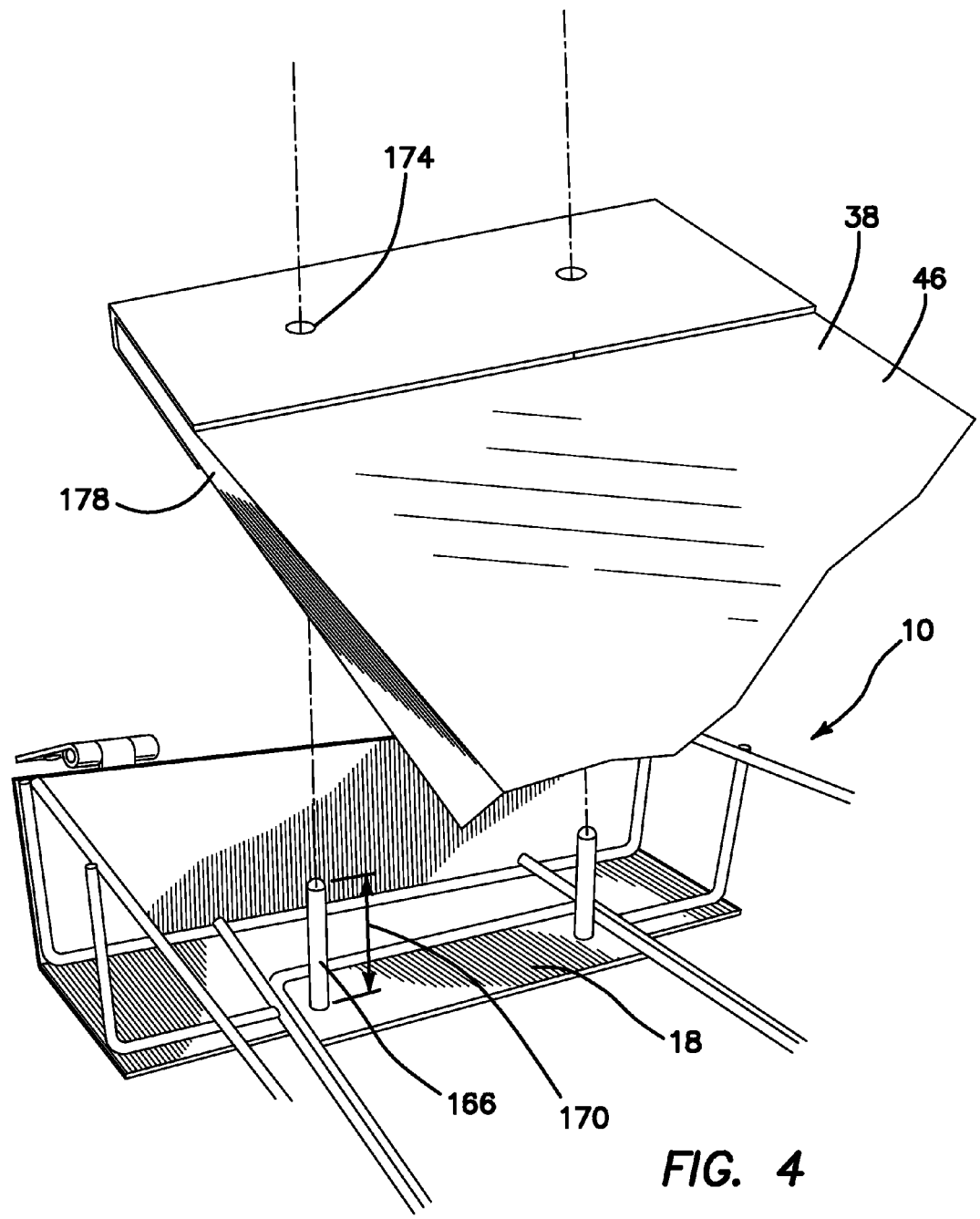
FIG. 4 is a is a perspective view of the FIG. 1 embodiment illustrating two mounting spikes and a header bag pack in a lay flat configuration.
Figure 4A:
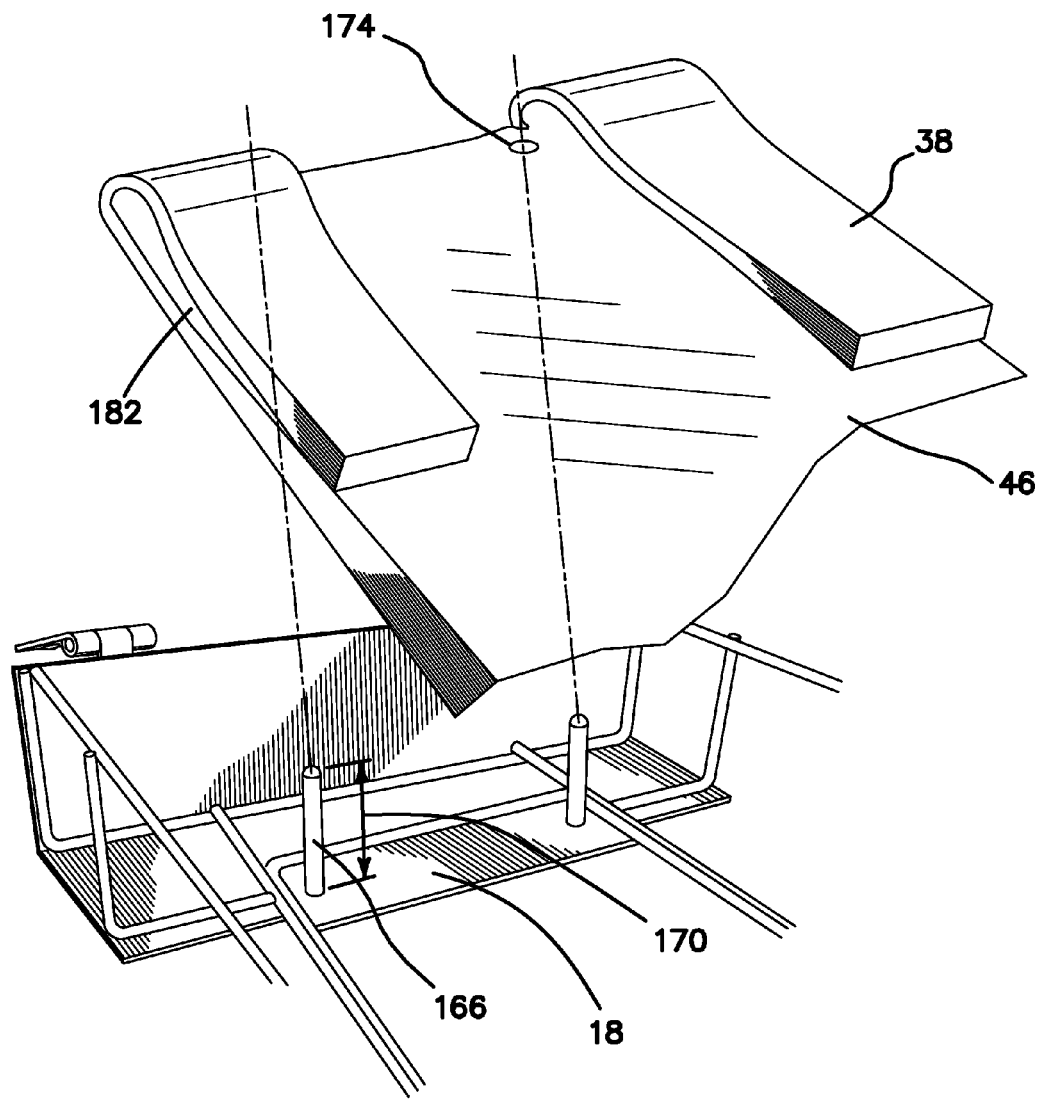
FIG. 4A is a is a perspective view of the FIG. 1 embodiment illustrating two mounting spikes and a T-shirt style bag pack in a folded configuration.
Figure 5:
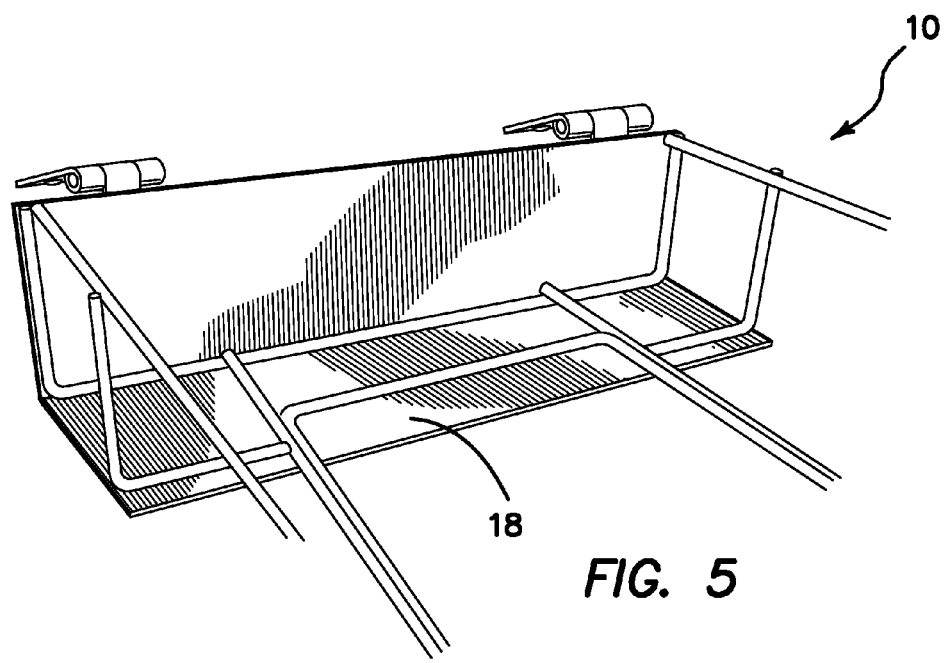
FIG. 5 is a is a perspective view of the FIG. 1 embodiment without mounting spikes.
Figure 6:
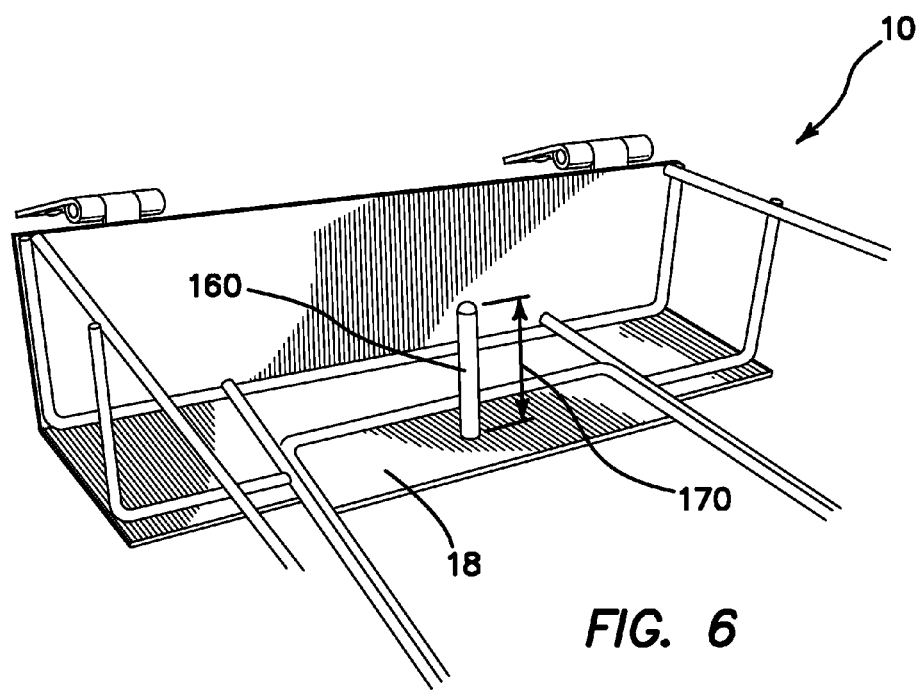
FIG. 6 is a is a perspective view of the FIG. 1 embodiment illustrating one mounting spike.

(7) In still a further variant, as illustrated in FIGS. 4, 4A and 6, the tilting tray bag dispenser rack 10 further includes at least one mounting spike 166. The at least one mounting spike 166 extends upwardly from the base 18 for a first predetermined distance 170 and is located to align with an aperture 174 extending through the bag pack 38.

Figure 8:
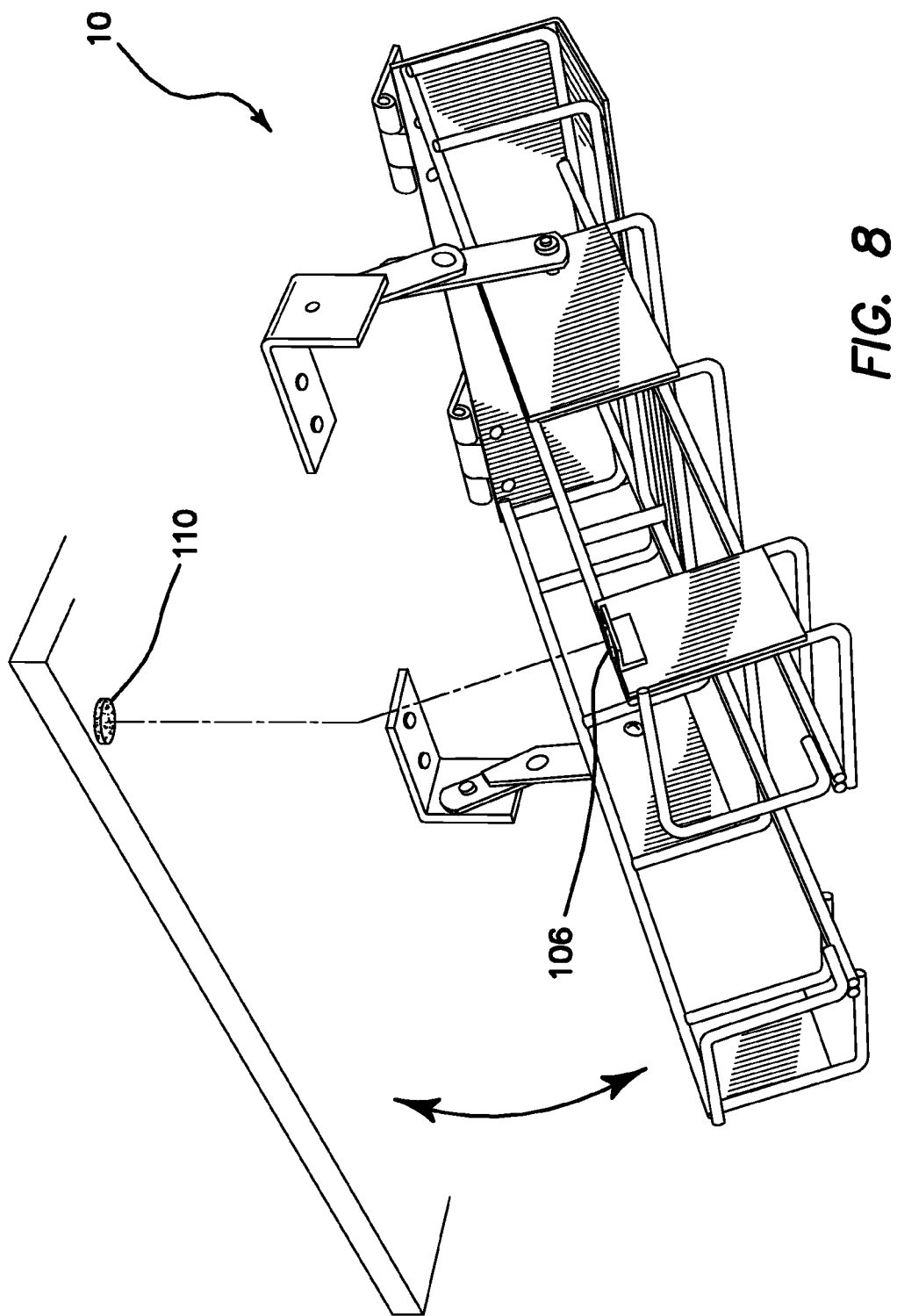
FIG. 8 is a is a perspective view of the FIG. 1 embodiment illustrating a position retention device involving a magnetic fastener arrangement in an open, bag loading position.

(8) In yet a further variant, as illustrated in FIG. 8, the moving portion 106 is magnetically attracted to the stationary portion 110.

(9) In another variant of the invention, the bag pack support tray 14 is formed from materials selected from the group includes wire, injection molded material, sheet metal and wood.

(10) In still another variant, as illustrated in FIG. 4, the bag pack support tray 14 is sized and shaped to hold a plurality of merchandise bags 46 in a stacked configuration 178.

(11) In yet another variant, as illustrated in FIG. 4A, the bag pack support tray 14 is sized and shaped to hold a plurality of merchandise bags 46 in a folded configuration 182.

Figure 7:
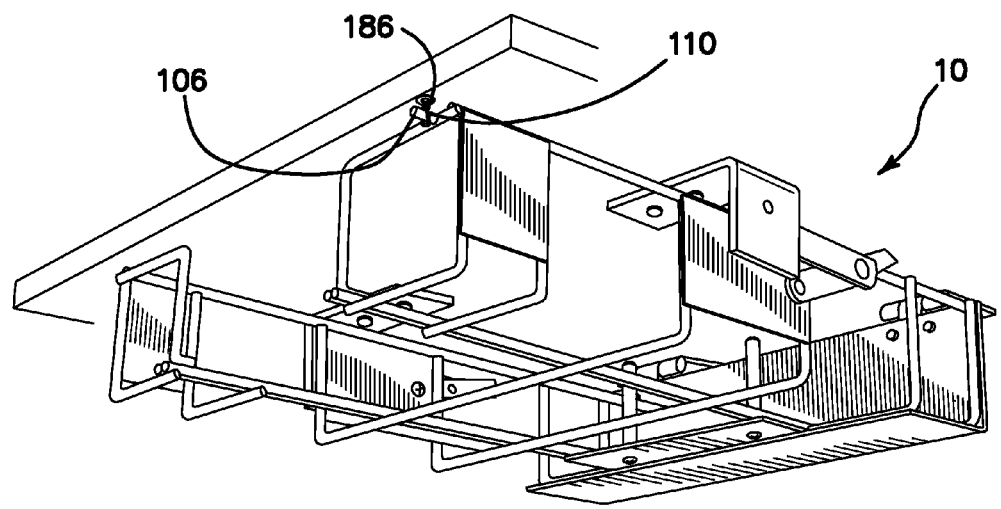
FIG. 7 is a is a perspective view of the FIG. 1 embodiment illustrating a position retention device involving a loop and post arrangement in a closed, bag dispensing position.
Figure 7A:
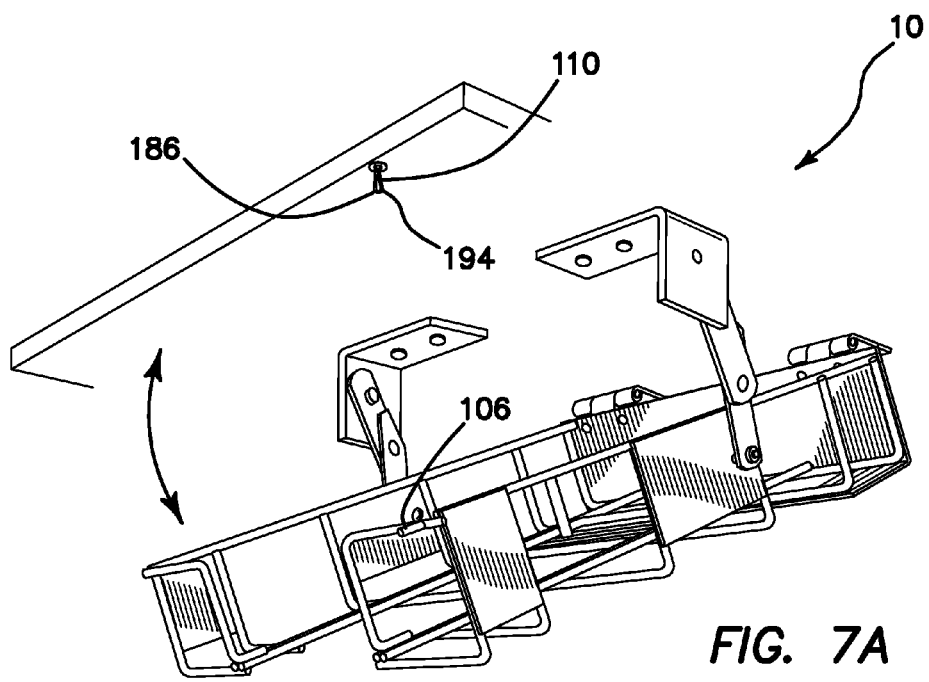
FIG. 7A is a is a perspective view of the FIG. 1 embodiment illustrating a position retention device involving a loop and post arrangement in an open, bag loading position.
Figure 9:
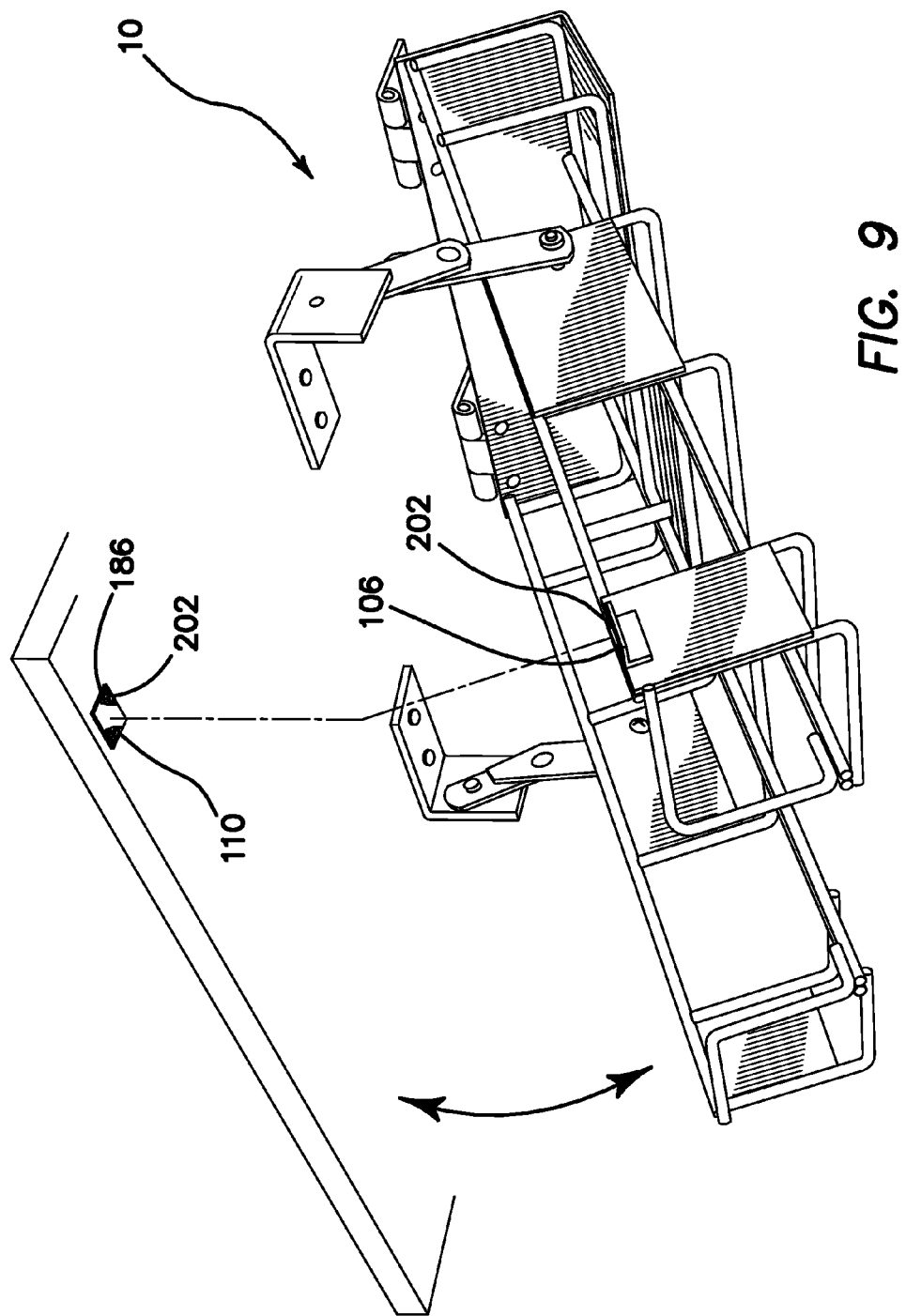
FIG. 9 is a is a perspective view of the FIG. 1 embodiment illustrating a position retention device involving a hooking and looping (Velcro®) arrangement in an open, bag loading position.

(12) In a further variant, as illustrated in FIGS. 7, 7A and 9, one of the moving portion 106 and the stationary portion 110 is a first fastening device 186 selected from the group includes hooks (not shown), loops 194, bails (not shown) and hooping and looping (Velcro®) fasteners 202. The other of the moving portion 106 and the stationary portion 110 is selected from the group includes components sized shaped and located to removably engage the first fastening device 186.

Figure 10:
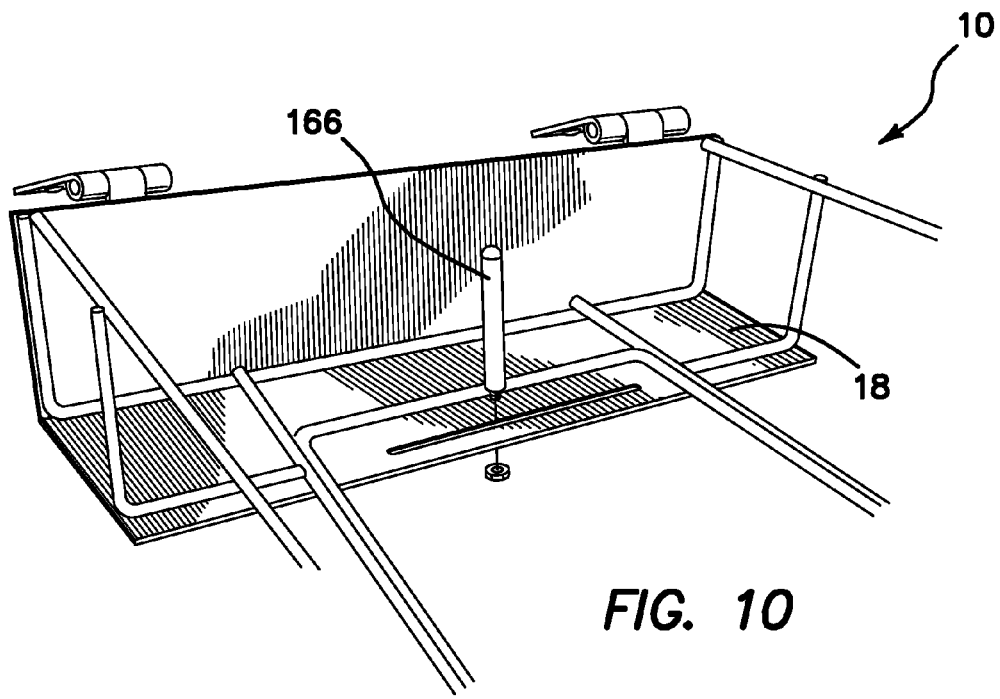
FIG. 10 is a partial perspective view of the bag pack support tray of the FIG. 1 embodiment illustrating a laterally movable/removable mounting spike.
Figure 12:
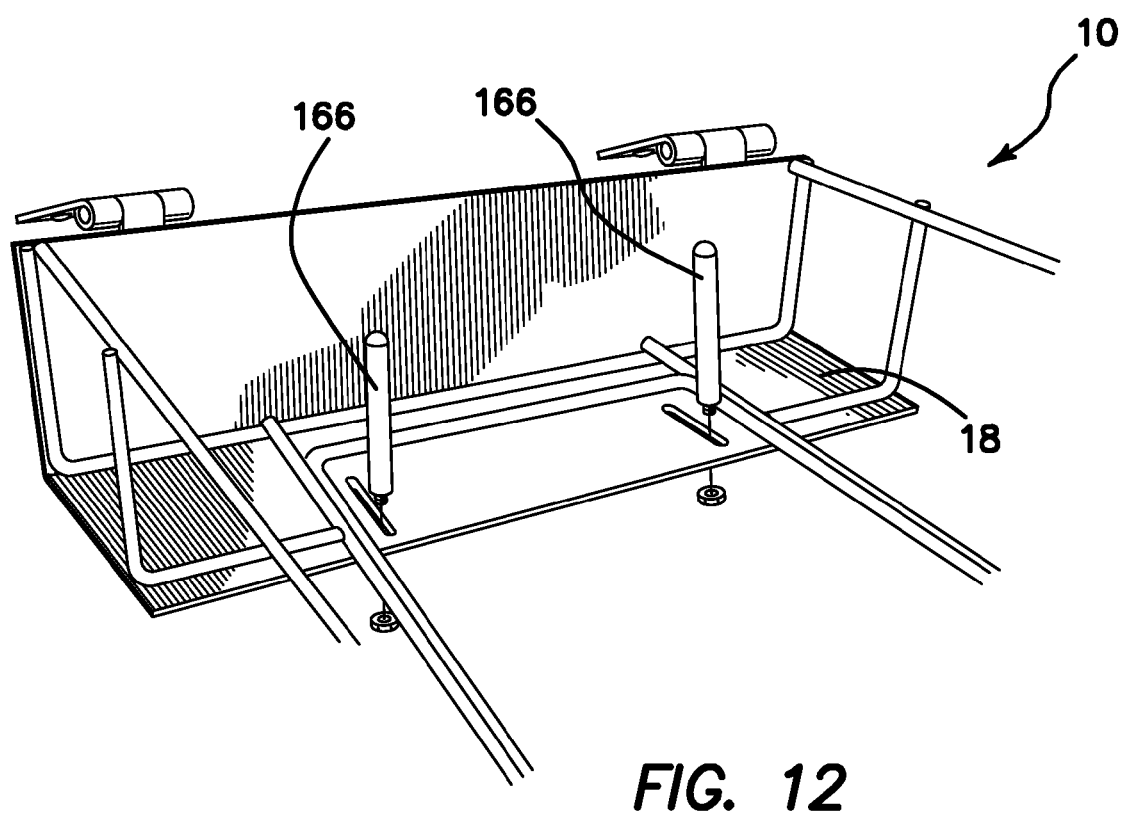
FIG. 12 is a partial perspective view of the bag pack support tray of the FIG. 1 embodiment illustrating a fore and aft movable/removable pair of mounting spikes.

(13) In another variant of the invention, as illustrated in FIGS. 10 and 12, the at least one mounting spike 166 is removably attached to the base 18.

(14) In still another variant, the at least one mounting spike 166 is movably attached to the base 18, thereby providing alternative locations for the mounting spike 166 on the base 18.

Figure 11:
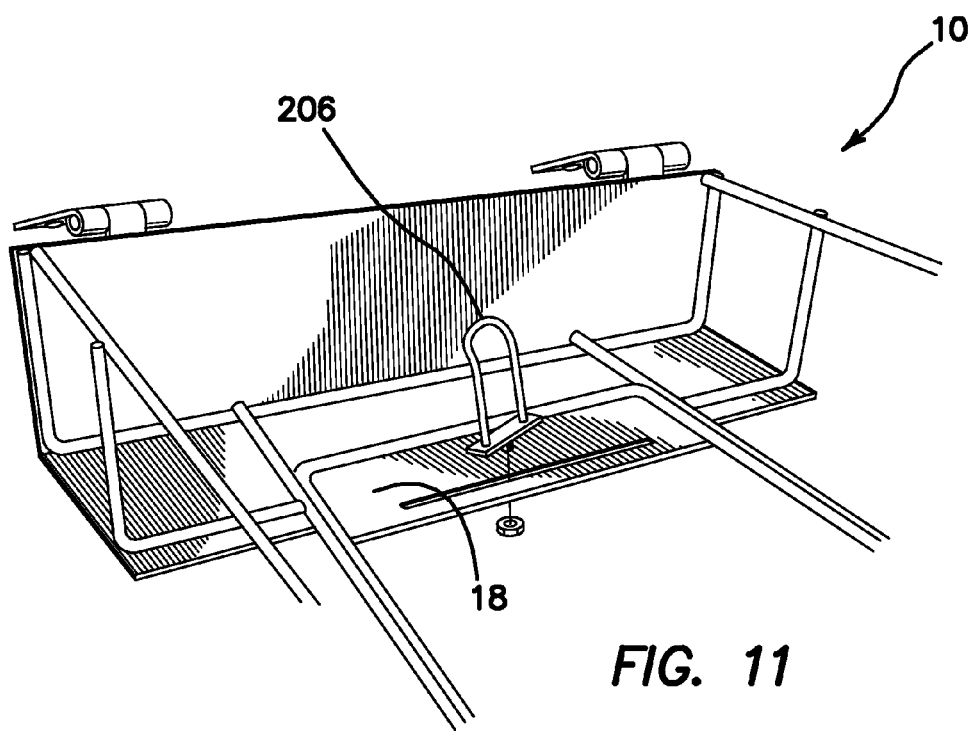
FIG. 11 is a partial perspective view of the bag pack support tray of the FIG. 1 embodiment illustrating a laterally movable/removable bag securing hook.

(15) In yet another variant, as illustrated in FIG. 11, at least one securing hook 206 is provided. The at least one securing hook 206 is attached to the base 18 and is located to align with an aperture 210 extending through the bag pack 38.

(16) In a further variant, the at least one securing hook 206 is removably attached to the base 18.

(17) In a final variant, the at least one securing hook 206 is movably attached to the base 18, thereby providing alternative locations for the securing hook 206 on the base 18.

The tilting tray bag dispenser rack 10 has been described with reference to particular embodiments. Other modifications and enhancements can be made without departing from the spirit and scope of the claims that follow.

The invention claimed is:

1. A tilting tray bag dispenser rack, comprising:
   a bag pack support tray, said support tray having a base, a first side wall, a second side wall, a back wall, a front wall and being sized and shaped to hold a merchandise bag pack;
   said front wall having an opening, said opening sized and shaped to permit extraction of bags from said bag pack;
   said bag pack support tray being hingedly attached adjacent an upper edge of said back wall to an underside of a counter;
   a first side support linkage, said first side linkage having a first upper arm and a first lower arm;
   said first upper arm being pivotally attached to a first side bracket, said first side bracket being attached to said underside of said counter;
   said first lower arm being pivotally attached to said first upper arm and pivotally attached to an outer surface of said first side wall;
   a second side support linkage, said second side linkage having a second upper arm and a second lower arm;
   said second upper arm being pivotally attached to a second side bracket, said second side bracket being attached to said underside of said counter;
   said second lower arm being pivotally attached to said second upper arm and pivotally attached to an outer surface of said second side wall;
   at least one position retention device, said position retention device having a moving portion and a stationary portion;
   said stationary portion of said at least one position retention device further comprises a spring-loaded check ball, said check ball disposed to move laterally;
   said moving portion further comprises a detent panel, said detent panel being sized, shaped and disposed to removably engage said spring-loaded check ball; and
   wherein upward movement of said support tray will cause said at least one said detent panel to removably engage said at least one spring-loaded check ball, thereby retaining said tray in an uppermost position;
   said stationary portion being attached to one of said underside of said counter and said bag pack support tray, said moving portion being attached to the other of said underside of said counter and said bag pack support tray; and
   said moving portion removably engaging said stationary portion and retaining said bag pack support tray in an upper, bag delivery position when engaged and permitting said bag pack support tray to move to a lower, loading position when disengaged.

2. The tilting tray bag dispenser rack, as described in claim 1, wherein:
   each of said first upper arm and said first lower arm have a first end, a midpoint, a second end and upper and lower edges;
   said first upper arm being pivotally attached adjacent said first end to said first side bracket;
   said first lower arm being pivotally attached adjacent said midpoint adjacent said second end of said first upper arm and pivotally attached adjacent said second end to said outer surface of said first side wall;
   said lower edge of said first lower arm having an outward facing ledge, said ledge being sized, shaped and disposed to rest upon said upper edge of said first upper arm when said bag pack support tray is in said lower, loading position, thereby limiting further movement of said tray;
   each of said second upper arm and said second lower arm have a first end, a midpoint, a second end and upper and lower edges;
   said second upper arm being pivotally attached adjacent said first end to said second side bracket;
   said second lower arm being pivotally attached adjacent said midpoint adjacent said second end of said second upper arm and pivotally attached adjacent said second end to said outer surface of said second side wall; and
   said lower edge of said second lower arm having an outward facing ledge, said ledge being sized, shaped and disposed to rest upon said upper edge of said second upper arm when said bag pack support tray is in said lower, loading position, thereby limiting further movement of said tray.

3. The tilting tray bag dispenser rack, as described in claim 2, wherein each of the upper edges of said first and second upper arms has an outward facing bulge, said bulges providing a bearing surface for said outward facing ledges of said lower edges of said first and second lower arms.

4. The tilting tray bag dispenser rack, as described in claim 1, wherein tension on said spring-loaded check ball is adjustable.

5. The tilting tray bag dispenser rack, as described in claim 1, wherein one of said moving portion and said stationary portion of said at least one one position retention device is attached to at least one of said first and second side brackets and the other of said moving portion and said stationary portion is attached to a corresponding outer surface of one of said first and second side walls.

6. The tilting tray bag dispenser rack, as described in claim 1, further comprising at least one mounting spike, said at least one mounting spike extending upwardly from said base for a first predetermined distance and being disposed to align with an aperture extending through said bag pack.

7. The tilting tray bag dispenser rack, as described in claim 6, wherein said at least one mounting spike is removably attached to said base.

8. The tilting tray bag dispenser rack, as described in claim 6, wherein said at least one mounting spike is movably attached to said base, thereby providing alternative locations for said mounting spike on said base.

9. The tilting tray bag dispenser rack, as described in claim 1, wherein said moving portion is magnetically attracted to said stationary portion.

10. The tilting tray bag dispenser rack, as described in claim 1, wherein said bag pack support tray is formed from materials selected from the group comprising:
   wire, injection molded material, sheet metal and wood.

11. The tilting tray bag dispenser rack, as described in claim 1, wherein said bag pack support tray is sized and shaped to hold a plurality of merchandise bags in a stacked configuration.

12. The tilting tray bag dispenser rack, as described in claim 1, wherein said bag pack support tray is sized and shaped to hold a plurality of merchandise bags in a folded configuration.

13. The tilting tray bag dispenser rack, as described in claim 1, wherein one of said moving portion and said stationary portion is a first fastening device selected from the group comprising hooks, loops, bails and chains and the other of said moving portion and said stationary portion is selected from the group comprising components sized shaped and disposed to removably engage said first fastening device.

14. The tilting tray bag dispenser rack, as described in claim 1, further comprising at least one securing hook, said at least one securing hook being attached to said base and being disposed to align with an aperture extending through said bag pack.

15. The tilting tray bag dispenser rack, as described in claim 14, wherein said at least one securing hook is removably attached to said base.

16. The tilting tray bag dispenser rack, as described in claim 14, wherein said at least one securing hook is movably attached to said base, thereby providing alternative locations for said securing hook on said base.

* * * * *